(No Model.)

J. C. KITTON.
ICE MACHINE.

No. 314,337. Patented Mar. 24, 1885.

Witnesses,
Geo. H. Strong.
J. H. Nourse.

Inventor,
John C. Kitton
By Dewey & Co.
Attorneys

UNITED STATES PATENT OFFICE.

JOHN C. KITTON, OF SAN FRANCISCO, CALIFORNIA.

ICE-MACHINE.

SPECIFICATION forming part of Letters Patent No. 314,337, dated March 24, 1885.

Application filed November 20, 1884. (No model.)

*To all whom it may concern:*

Be it known that I, JOHN C. KITTON, of the city and county of San Francisco, and State of California, have invented an Improvement in Ice-Machines; and I hereby declare the following to be a full, clear, and exact description thereof.

My invention relates to certain improvements in ice-machines, and is an improvement on Letters Patent No. 311,013, granted to me January 20, 1885; and it consists, mainly, in a series of open-ended chambers supported within a tank, so as to be surrounded by a freezing medium, packing-plates by which the fresh water within the chambers is prevented from coming in contact with the freezing medium without, and a space or chamber surrounding and below the refrigerating-chamber, and with which the ends of the freezing-chambers communicate for the purpose of depositing the impurities of the water, so that they will not be contained in the ice after it is formed.

My invention consists, also, in certain details of construction and in a means for producing a circulation of water through the chambers while the freezing is going on, all of which will be more fully explained by reference to the accompanying drawings, in which—

Figure 1:
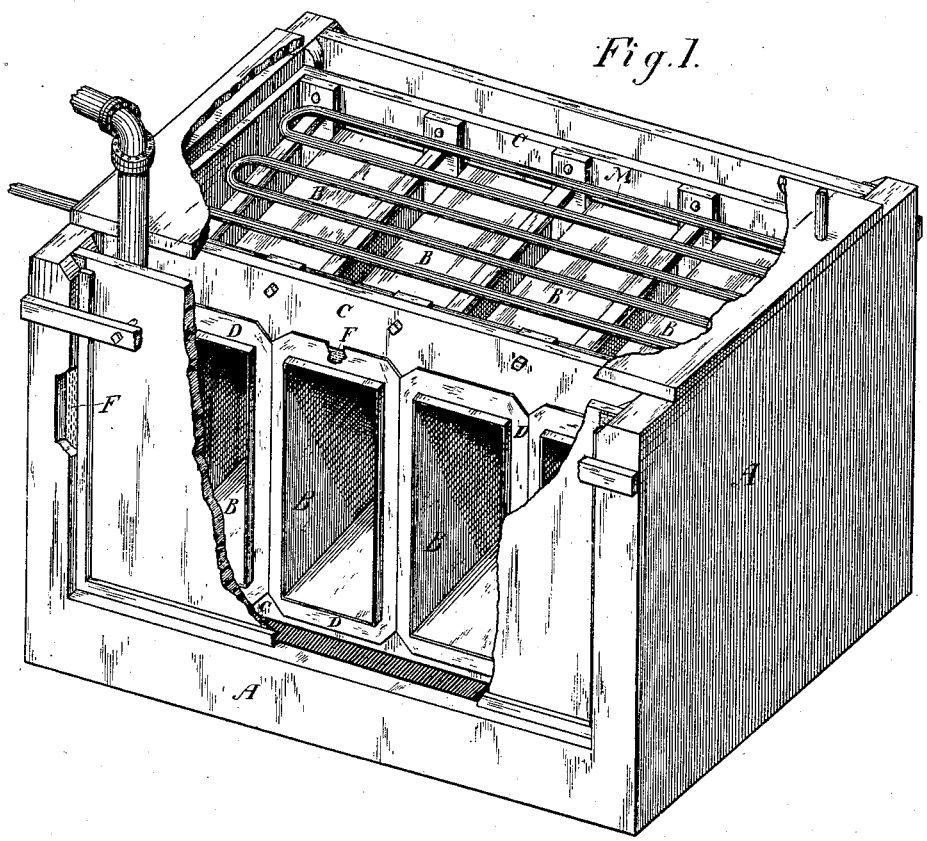
Figure 2:
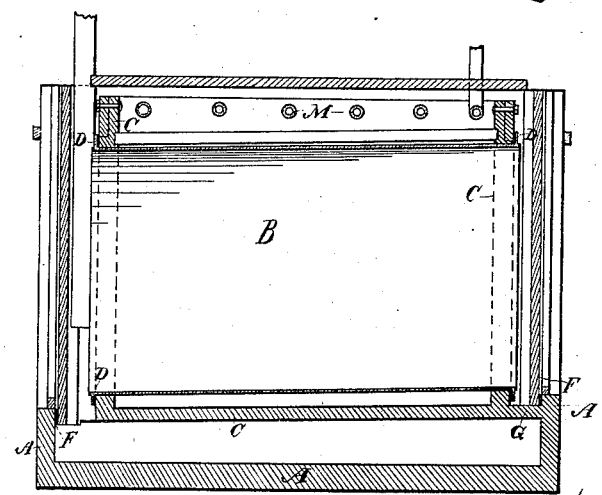

Figure 1 is a perspective view of my apparatus. Fig. 2 is a transverse section.

A is an exterior tank, which may be made of wood or other suitable material, and of a size sufficient to contain the desired number of freezing-chambers and the necessary amount of freezing medium and fresh water. A series of metal chambers or molds, B B, are placed within this tank so that their length is transverse to the tank, and their opposite ends are left open, the sides being closed all about. These molds are supported in a frame-work, C, which extends from end to end within the main tank, and they have flanges D, which are packed with rubber or other suitable material, so that no leakage of water can occur between the spaces surrounding the molds and that with which their ends communicate. These tanks are sufficiently separated by the framework within which they are held to allow a circulation of the freezing medium around them, and there is also a space beneath, so that it can pass below as well as at the sides, and when the chamber is full it stands at a sufficient depth above the top of the molds or chambers, so that they and ammonia-pipes or other freezing agent are entirely surrounded by it, while the flanges D prevent any escape toward the ends. The molds slide vertically in the guides of the frame C, so that they may be removed at will. The open ends of these freezing chambers or molds project slightly beyond the packing-flanges D into the space which is formed between them and the outer sides of the main tank A. These sides are made to slide up or down in guides formed for the purpose, and they have a packing, F, secured around their exterior edges, so that when the space within them is filled with fresh water it also fills the interior of the freezing-chambers, and exerts an outward pressure against these gates or sides which is sufficient to press them outward and by means of the packing form a tight joint. Beneath the framework in which the molds are supported is a tight bottom, which prevents the freezing medium from escaping downward into that portion of the tank A which is situated beneath, and which also connects with one end of the molds, so that the water from these chambers may circulate through it. A partition, G, is fixed across near the bottom and at the opposite end, so that the water cannot rise into that end of the freezing-chambers. Pipes containing the ammonia or other material by which the freezing medium is cooled to the desired temperature may extend backward and forward through the upper part of the chamber containing it and above the freezing chambers or molds, as shown at M. In practice the freezing-chambers are made so that a transverse section would form a parallelogram, and they may be set either horizontally, at an incline, or vertically; but for practical use I prefer to place them in a slightly-inclined position, as shown, so that when the water within them has been frozen so as to form ice, and the freezing medium around the cans drawn off, the ice may be loosened by warm or ordinary water, or by steam, and when loosened it will easily slide down the inclined bottom of the chambers, so that it may be drawn out by simply removing the side or gate at that end. The space beneath the bottom of the chambers containing the freezing-mixture, and with which one end of the freezing-chambers connects, is for the purpose of receiving the impurities which are always deposited from water as it freezes, and as these impurities are driven out the ice is made pure.

It is a well-known fact that ice freezes clearer when the water is slightly in motion, and in order to produce a slow current through the chambers while the freezing is taking place I connect the pump with one end of the space into which the chambers open, and, by drawing the water from this end and discharging it into the other end where the partition G is, I produce a slight but constant circulation from one end to the other of the chambers until the freezing is nearly completed. This circulation has also a tendency to carry the impurities out of the chambers, so that they may drop down within the space at the bottom of the chamber A, as before described.

Having thus described my invention, what I claim as new, and desire to secure by Letters Patent, is—

1. In an ice-machine, the four-sided open-ended molds or chambers within which the ice is to be formed, an inclosing-chamber around the sides, within which the refrigerating-liquid may be contained, and an exterior chamber with which the open ends of the molds connect, with a space or compartment below the refrigerator for the reception of impurities from the water to be frozen, substantially as herein described.

2. In an ice-machine, the open-ended four-sided molds placed side by side and extending transversely across a compartment within which they lie and are surrounded by a refrigerating-liquid, an exterior fresh-water compartment into which the ends of the molds open, and flanges and packing surrounding the ends of the molds, whereby tight joints are maintained between the outer and inner compartments, substantially as herein described.

3. In an ice-machine, the four-sided open-ended molds extending transversely across a compartment within which they lie and are surrounded by a freezing-liquid, an exterior fresh-water chamber with which the open ends of the molds alone communicate, said chamber having vertically-sliding sides or gates placed opposite the ends of the molds, and having packing around their edges, so that the outward pressure of the water retains them in place and makes tight joints, substantially as herein described.

4. In an ice-machine, the four-sided open-ended molds placed transversely across a chamber containing a refrigerating-liquid, said molds being inclined from one end to the other and having their open ends connecting with an exterior fresh-water space having removable sides or gates placed opposite the molds, substantially as herein described.

5. In an ice-machine, the open-ended four-sided molds or chambers set transversely within a compartment containing a refrigerating-liquid, an exterior chamber into which the ends of the molds open, and which also extends beneath the refrigerating-compartment, together with a partition or diaphragm whereby the water from one end of the molds is cut off from the space below, substantially as herein described.

6. In an ice-machine, the open-ended four-sided molds or chambers placed transversely across a compartment containing a refrigerating-liquid, and an exterior surrounding chamber into which the ends of the molds open, said chamber having a partition across the bottom at one side, in combination with a pump or means for transferring the water from one end to the other of the molds and producing a current therein, substantially as herein described.

In witness whereof I have hereunto set my hand.

JOHN C. KITTON.

Witnesses:
S. H. NOURSE,
H. C. LEE.